J. SMOTER.
BOILER ATTACHMENT.
APPLICATION FILED MAR. 2, 1920.

1,344,829.

Patented June 29, 1920.
2 SHEETS—SHEET 1.

Inventor
J. Smoter

By A. M. Wilson

Attorney

J. SMOTER.
BOILER ATTACHMENT.
APPLICATION FILED MAR. 2, 1920.
1,344,829.
Patented June 29, 1920.
2 SHEETS—SHEET 2.
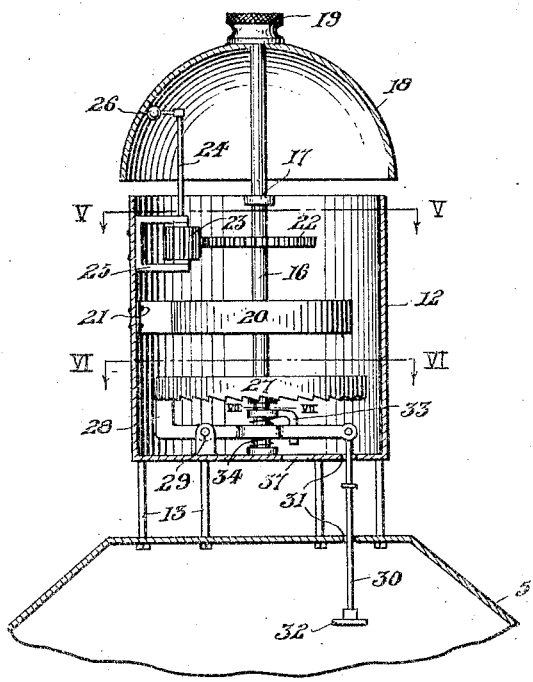
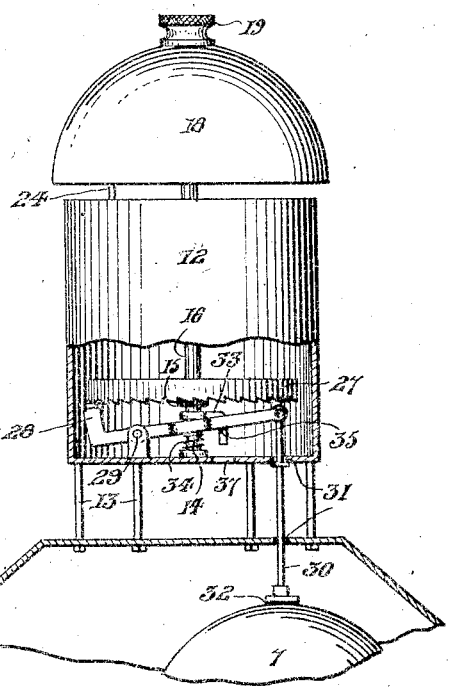
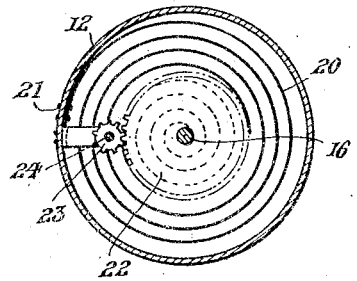
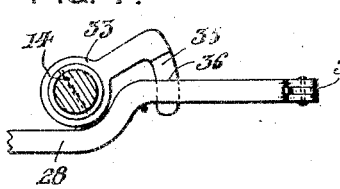
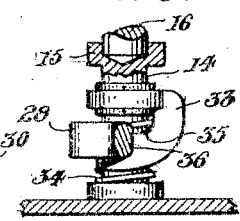
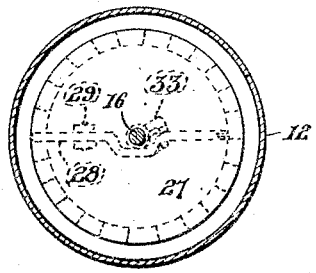
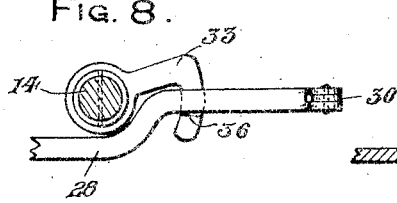
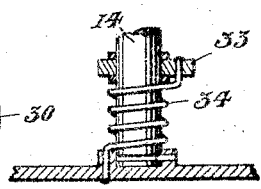
Inventor
J. Smoter
By A. M. Wilson
Attorney

UNITED STATES PATENT OFFICE.

JAN SMOTER, OF CONEMAUGH, PENNSYLVANIA.

BOILER ATTACHMENT.

1,344,829.   Specification of Letters Patent.   Patented June 29, 1920.

Application filed March 2, 1920. Serial No. 362,688.

*To all whom it may concern:*

Be it known that I, JAN SMOTER, a citizen of Poland, residing at Conemaugh, in the county of Cambria and State of Pennsylvania, have invented certain new and useful Improvements in Boiler Attachments, of which the following is a specification.

This invention relates to certain new and useful improvements in attachments for domestic and other boilers and is particularly adapted to automatically be operated upon the excessive boiling of liquid within the boiler for sounding an alarm to notify the cook of that fact.

A further object of the invention is to provide the device with means for automatically raising the lid of the boiler upon excessive boiling of the liquid contained therein so as to permit the escape of steam from the boiler and thereby temporarily prevent the liquid from boiling over.

With the above general objects in view and others that will become apparent as the nature of the invention is better understood, the same consists in the novel form, combination and arrangement of parts hereinafter fully described, shown in the accompanying drawings and claimed.

In the drawings wherein like reference characters designate corresponding parts throughout the several views, Figure 1 is a view of a boiler partly in section and partly in elevation with an attachment embodying the present invention operatively associated therewith.

Fig. 3 is a vertical sectional view of the alarm mechanism of the present invention and a fragment of the boiler cover with the stop thereof operatively disposed, Fig. 4 is a view somewhat similar to Fig. 3 with the stop released by the float, Fig. 5 is a horizontal sectional view taken substantially upon line V—V of Fig. 3.

Fig. 6 is a transverse sectional view taken substantially upon line VI—VI of Fig. 3.

Figure 1:
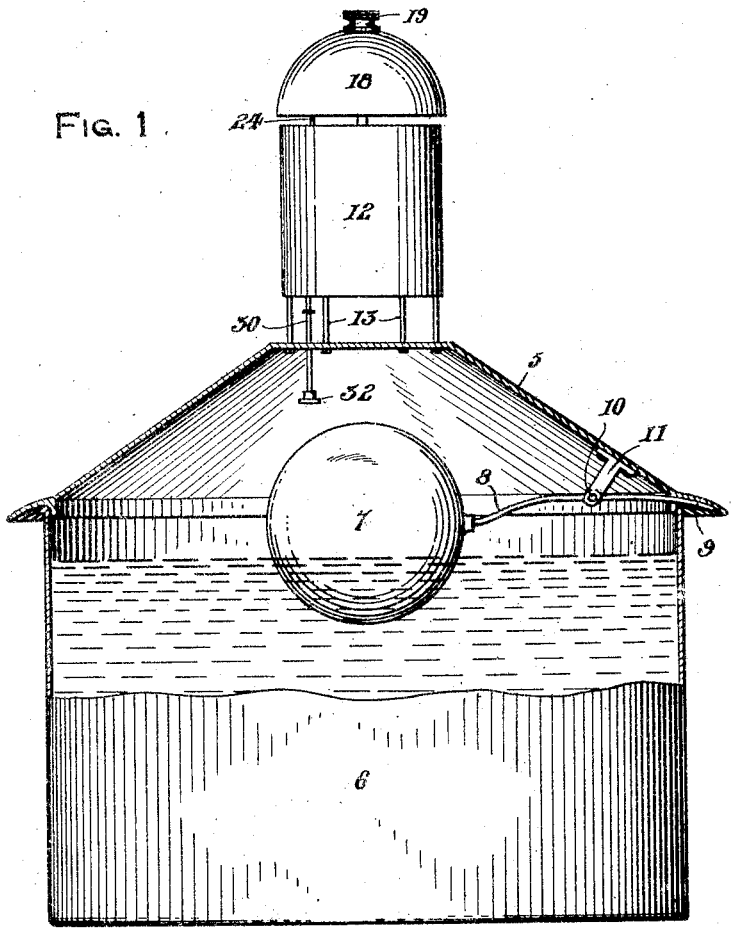
Figure 2:
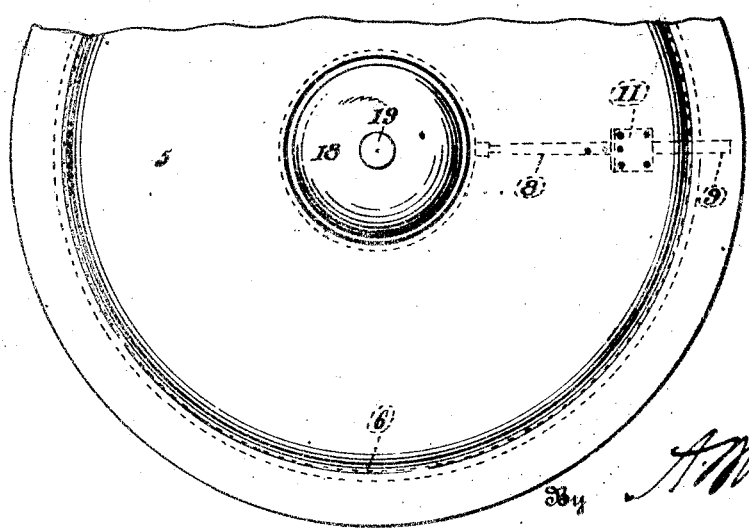
Fig. 2 is a top plan view of the device shown in Fig. 1 partly broken away.

Fig. 7 is an enlarged fragmentary view partly in top plan and partly in section of the alarm stop member and the latch for holding the same released, said latch being shown in inoperative position, Fig. 8 is a view similar to Fig. 7 with the latch in operative position, Fig. 9 is an elevational view of the device shown in Fig. 7 and associated parts, and Fig. 10 is a view similar to Fig. 9 with the latch in section and the stop omitted.

Referring more in detail to the several views, the present invention specifically provides an attachment for the lid 5 of a domestic boiler 6 or other analogous vessel, and includes a ball float 7 which is rigidly attached to an arm 8 that extends from the central portion of the boiler and passes over the edge of the latter beneath the lid of the same as at 9. The arm 8 is pivoted intermediate its ends as at 10 to a bracket 11 which is rigidly fastened to the under side of the cover 5 adjacent its margin, and it will be seen that when the liquid within the boiler boils excessively, the ball float 7 will be raised so as to exert a lifting force upon the cover 5 and thereby permit escape of steam for temporarily preventing the liquid boiling over.

A suitable alarm casing 12 is rigidly mounted upon the central portion of the cover 5 by means of posts 13 or the like, and a post 14 is rigidly centrally mounted in an upright position within said casing. The upper end of the post 14 is provided with a suitable socketed enlargement 15 in which the lower end of the alarm shaft 16 rotatably rests, and the shaft 16 is also journaled in a bearing 17 provided on the inside of the casing 12 adjacent its upper end. The shaft 16 extends above the top of the casing 12 and has a bell or sound producing shell 18 suitably fastened thereon by means of a nut 19 or the like.

A coil spring 20 has its inner end fastened to the shaft 16 and has its outer end fastened as at 21 to the casing 12. A large spur gear 22 is fastened upon the shaft 16 above the spring 20, and this gear meshes with a pinion 23 which is fastened upon a short shaft 24 journaled in the bracket 25 which is rigidly mounted within the casing 12. The shaft 24 extends upwardly within the shell 18 and has a hammer or knocker 26 fastened upon the upper end thereof in such position that when the shaft 24 is rotated said hammer will intermittently hit the shell 18 and sound an alarm.

The shaft 16 has a crown ratchet wheel 27 fastened upon the lower end portion thereof beneath the spring 20, and a stop 28 is pivotally mounted as at 29 upon the bottom of the casing 12 so that one of its ends normally engage a tooth of the ratchet wheel 27. The opposite end of the stop 28 has a push rod 30 pivoted thereto, and this rod extends downwardly through relatively large alined openings 31 which are provided in the bottom of the casing 12 and in the cover 5. The lower end of the rod 30 may be headed as at 32 and is disposed in the path of the float 7 so that when the latter rises or is caused to rise by the excessive boiling of the liquid, said float will engage the rod 30 and move the same upwardly for rocking the stop 28 to release the free end of the latter from the ratchet wheel 27. When this takes place the spring 20 is free to rotate shaft 16 and through the gears 22 and 23 the hammer 26 is caused to sound the alarm. On the other hand, the spring 20 is placed under tension by rotation of the shaft 16 in a reverse direction by turning the shell 18 as is usual in this class of alarms. It will thus be apparent that the present invention not only provides a means for raising the cover of a vessel to permit the escape of steam therefrom so as to temporarily prevent boiling over of the liquid, but also provides a substantially simultaneously operated alarm to be heeded by the cook in time to remove the boiler from the fire entirely for positively preventing the liquid from boiling over.

It is desirable that the alarm be forced to continue to operate until some one hears the same and attends to the boiler, and in order to accomplish this, I mount a latch 33 rotatably upon the post 14 adjacent the longer portion of the stop 28, and this latch 33 is normally rotated by a torsion spring 34 so as to bring its shoulder 35 beneath the stop 28 when the latter is moved to its released position as seen in Fig. 4. The end face of the latch 33 which is indicated in Fig. 9 as at 36 will engage the side of the stop 28 when the parts are normally disposed, at which time the stop 28 is engaged with the ratchet wheel 27 for preventing rotation of the shaft 16 and parts secured thereto.

Briefly described, the operation of the alarm is as follows:—

The float 7 is raised as hereinbefore mentioned and raises the rod 30 for releasing the stop 28, whereupon the spring 34 rotates the latch 33 for engaging its shoulder 35 beneath the stop 28 so as to hold the latter in released position as shown in Fig. 4. When the stop 28 is released, the spring 20 rotates the shaft 16 and through the gearing described actuates the hammer 26 as will be apparent. When the attendant or cook has removed the boiler from the fire, she or he may insert any suitable device through the aperture 37 provided in the bottom of the casing 12 for releasing the latch 33 from the stop 28 so as to permit the latter to again engage the ratchet wheel 27. If necessary the spring 20 is again wound by rotation of the shaft 16 and the device is ready for reuse.

From the foregoing description it is believed that the construction and operation as well as the advantages of the present invention will be readily understood and appreciated by those skilled in the art.

Minor changes may be made without departing from the spirit and scope of the invention as claimed.

What I claim is:—

1. An alarm attachment for boilers and like vessels comprising a casing, means for rigidly mounting said casing upon the cover of a vessel, a shaft journaled within said casing and carrying a sound producing shell, a spring to rotate said shaft, a hammer, means operatively connecting said hammer to said shaft for rotating said hammer when the shaft is rotated whereby said hammer is caused to intermittently strike said shell, a ratchet wheel carried by said shaft, a pivoted stop carried by the casing and arranged to engage said ratchet wheel for preventing rotation of said shaft, a rod extending outwardly through the casing and connected to said stop whereby, when the rod is pushed inwardly of the casing said stop is released from said ratchet wheel for permitting rotation of said shaft, and a float for actuating said rod.

2. An alarm attachment for boilers and like vessels comprising a casing, means for rigidly mounting said casing upon the cover of a vessel, a shaft journaled within said casing and carrying a sound producing shell, a spring to rotate said shaft, a hammer, means operatively connecting said hammer to said shaft for rotating said hammer when the shaft is rotated whereby said hammer is caused to intermittently strike said shell, a ratchet wheel carried by said shaft, a pivoted stop carried by the casing and arranged to engage said ratchet wheel for preventing rotation of said shaft, a rod extending outwardly through the casing and connected to said stop whereby, when the rod is pushed inwardly of the casing said stop is released from said ratchet wheel for permitting rotation of said shaft, a float for actuating said rod, and a spring actuated latch for retaining said stop released from said ratchet wheel.

3. In combination with a vessel having a cover, a float arranged within said vessel, an alarm mechanism mounted upon said cover, said alarm mechanism including a stop having operative connection with the float whereby the stop is released upon rising of the float for sounding the alarm, and a spring actuated latch for retaining said stop released.

4. In combination with a domestic cooking vessel having a cover, a float arranged substantially centrally within said vessel, and an alarm mechanism substantially centrally rigidly mounted upon said cover, said alarm mechanism including a pivoted stop having a vertical straight rod pivoted thereto, said rod extending downwardly through the cover to a point within the vessel in proximity to the float whereby said rod is slid upwardly for releasing the stop upon rising of the float for sounding the alarm.

In testimony whereof I affix my signature.

JAN SMOTER.